(12) United States Patent
Yamane et al.

(10) Patent No.: US 8,420,763 B2
(45) Date of Patent: Apr. 16, 2013

(54) FLUOROOXYALKYLENE GROUP-CONTAINING POLYMER COMPOSITION, A SURFACE TREATMENT AGENT COMPRISING THE SAME AND AN ARTICLE TREATED WITH THE AGENT

(75) Inventors: Yuji Yamane, Annaka (JP); Noriyuki Koike, Takasaki (JP); Hirofumi Kishita, Annaka (JP); Koichi Yamaguchi, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 273 days.

(21) Appl. No.: 12/911,890

(22) Filed: Oct. 26, 2010

(65) Prior Publication Data

US 2011/0098402 A1 Apr. 28, 2011

(30) Foreign Application Priority Data

Oct. 27, 2009 (JP) .................................. 2009-247032
Oct. 4, 2010 (JP) ................................. 2010-225128

(51) Int. Cl.
*C08G 77/24* (2006.01)

(52) U.S. Cl.
USPC .......................................................... 528/42

(58) Field of Classification Search ...................... 528/42
See application file for complete search history.

(56) References Cited

U.S. PATENT DOCUMENTS 6,277,485 B1 * 8/2001 Invie et al. .................... 428/336

2003/0139620 A1 7/2003 Yamaguchi et al.
2007/0197758 A1 8/2007 Yamane et al.

FOREIGN PATENT DOCUMENTS

| EP | 1 300 433 A2 | 4/2003 |
|---|---|---|
| JP | 58-167597 A | 10/1983 |
| JP | 2000-143991 A | 5/2000 |
| JP | 2003-238577 A | 8/2003 |
| JP | 2007-297589 A | 11/2007 |
| WO | WO 2008/027698 A1 | 3/2008 |
| WO | WO 2008/121469 A1 | 10/2008 |

OTHER PUBLICATIONS

European Search Report dated Dec. 15, 2010, issued in European Patent Application No. 10 18 8316.

* cited by examiner

*Primary Examiner* — Margaret Moore
(74) *Attorney, Agent, or Firm* — Birch, Stewart, Kolasch & Birch, LLP (57) ABSTRACT

An object of the present invention is to provide a fluorooxyalkylene group-containing polymer composition, which yields a coating having excellent adhesior to a substrate, good water- and oil-repellency, a low dynamic friction coefficient, good releasing property, good abrasion resistance and good stain resistance, and to provide a surface treatment agent comprising the same. The present inventors have found that a composition comprising a fluorooxyalkylene group-containing polymer having a fluorinated group and a hydrolyzable group at each terminal and a fluorooxyalkylene group-containing polymer having hydrolyzable groups at both terminals can form a coating which has excellent water- and oil-repellency, a low dynamic friction coefficient, good releasing property, good abrasion resistance, and good stain resistance.

8 Claims, 1 Drawing Sheet

FLUOROOXYALKYLENE GROUP-CONTAINING POLYMER COMPOSITION, A SURFACE TREATMENT AGENT COMPRISING THE SAME AND AN ARTICLE TREATED WITH THE AGENT

CROSS REFERENCE

This application claims the benefits of Japanese Patent application No. 2009-247032 filed on Oct. 27, 2009, and Japanese Patent application No. 2010-225128 filed on Oct. 4, 2010 the contents of which are hereby incorporated by reference.

FIELD OF THE INVENTION

The present invention relates to a fluorooxyalkylene group-containing polymer composition, specifically, relates to a composition which forms a coating having good adhesiveness to a substrate, water- and oil-repellency, a low dynamic friction coefficient, a good releasing property, good abrasion resistance and good stain resistance, and relates to a surface treatment agent comprising the same.

BACKGROUND OF THE INVENTION

Compounds containing a perfluorooxyalkylene moiety generally have a very small surface free energy and, accordingly, have good water- and oil-repellency, chemical resistance, lubricity, releasing property, and antifouling property. Taking advantage of these properties, they are widely used as, for example, water- and oil-repellent agents or antifouling agents for paper or fiber, lubricants for magnetic storage media, oil repellents components for precision apparatuses, releasing agents, cosmetic, and protective coatings.

These properties, on the other hand, mean that such compounds do not stick or closely adhere to other materials, either. Even if they can be applied to a material, it is difficult to have a coating closely adhered to the material.

Meanwhile, silane coupling agents are well known as an agent which bonds an organic compound to a surface of a substrate such as glass or a cloth. The silane coupling agents have an organic functional group and a reactive silyl group, usually an alkoxy silyl group, in a molecule. The alkoxy silyl group autocondenses in the presence of moisture in air to become a siloxane and forms a coating. At the same time, the alkoxy silyl group chemically and physically bonds to a surface of glass or metal to form a durable coating. Taking advantage of these properties, the silane coupling agents are widely used as a coating agent for various substrates. Compounds based on the silane coupling agents to provide the feature of the perfluorooxyalkylene moieties on a surface of a substrate are known.

For instance, Japanese Patent Application Laid-Open No. Sho-58-167597 discloses that a fluoroaminosilane compound represented by the following formula is applied on glass to attain high water- and oil-repellency:

wherein $R^2$ and $R^3$ are alkyl groups having 1 to 4 carbon atoms, $R^1$ is $CH_2CH_2CH_2$ or $CH_2CH_2NHCH_2CH_2CH_2$, h is an integer of from 0 to 8, and "i" is 2 or 3.

However, the perfluorooxyalkylene moiety of this compound is relatively short, so that the characteristics of the perfluorooxyalkylene moiety, particularly lubricity, a releasing property, and an antifouling property, are not well exhibited.

Japanese Patent Application Laid-Open No. 2000-143991 discloses perfluoropolyether-modified aminosilane represented by the following formula, as a compound having a long perfluorooxyalkylene moiety, wherein X is a hydrolyzable group, $R^4$ is a monovalent hydrocarbon group, $R^6$ is a hydrogen atom or a monovalent hydrocarbon group, $R^5$ is an alkylene group optionally interrupted by an NH group, j is an integer of from 14 to 49, and k is 2 or 3.

The perfluoropolyether-modified aminosilane has a high water- and oil-repellency on account of the terminal fluorine-containing group. However, its stain resistance and lubricity are insufficient due to the branch structure in the main chain.

Recently, there is an increasing need for technology to attain fingerprint proofness or easy removal of fouling on a surface of a display for better appearance or visibility. Thus, a material which meets these requirements is desired.

Japanese Patent Application Laid-Open No. 2003-238577 discloses a perfluoropolyether-modified silane represented by the following formula, as a treatment agent which has a perfluorooxyalkylene moiety with no branch structure in the main chain, wherein Rf is a divalent linear perfluoropolyether group, R is an alkyl group having 1 to 4 carbon atoms or a phenyl group, X is a hydrolyzable group, l is an integer of from 0 to 2, m is an integer of from 1 to 5, and a is 2 or 3.

Lenses and anti-reflection films treated with the aforesaid perfluoropolyether-modified silane are good in stainproofness, easy removal of fouling, lubricity and a releasing property, compared to the perfluoropolyether-modified silane having a branch structure. Further, abrasion resistance is superior to the prior perfluoropolyether-modified silane, because the both terminals thereof are fixed on a substrate. However, the lubricity intrinsic to this perfluoropolyether is not well exhibited due to the both terminals being fixed on a substrate, so that further improvement is required. Further, unreacted terminal moieties remaining after curing reduce water- and oil-repellency, releasing property and lubricity. Therefore, improvement on these properties by decreasing unreacted terminal moiety is desired.

Japanese Patent Application Laid-Open No. 2007-297589 discloses a perfluoropolyether-modified silane represented by the following formula, as a treatment agent which has improved lubricity, wherein Rf is a divalent perfluoroether-containing group, Q is a divalent organic group, $Z^1$ and $Z^2$ are organopolysiloxane moieties, A is a monovalent group having a terminal reactive silyl group, α is an integer of from 1 to 8, and β is the number larger than 0 and less than 2.

However, this compound does not have a terminal fluorinated group, so that its water- and oil-repellency, dynamic friction coefficient and releasing property are inferior.

Patent literature 1: Japanese Patent Application Laid-Open No. Sho-58-167597
Patent literature 2: Japanese Patent Application Laid-Open No. 2000-143991
Patent literature 3: Japanese Patent Application Laid-Open No. 2003-238577
Patent literature 4: Japanese Patent Application Laid-Open No. 2007-297589

SUMMARY OF THE INVENTION

Problems to be Solved by the Invention

Stain resistance depends on a dynamic friction on a surface of a coating, if releasing properties of stains are same. Therefore, a surface treatment agent is desired which attains good water- and oil-repellency, low dynamic friction coefficient, and good releasing property all together. Further, of two coatings which have same adhesiveness to a substrate, a coating having a lower dynamic friction has better attrition resistance and abrasion resistance, compared to another coating having a higher dynamic friction, and thereby maintains stain resistance for a longer period.

An object of the present invention is to provide a fluorooxyalkylene group-containing polymer composition, which yields a coating having excellent adhesior to a substrate, good water- and oil-repellency, a low dynamic friction coefficient, good releasing property, good abrasion resistance and good stain resistance, and to provide a surface treatment agent comprising the same.

Means to Solve the Problems

The present inventors have found that a composition comprising a fluorooxyalkylene group-containing polymer having a fluorinated group and a hydrolyzable group at each terminal and a fluorooxyalkylene group-containing polymer having hydrolyzable groups at both terminals can form a coating which has excellent water- and oil-repellency, a low dynamic friction coefficient, good releasing property, good abrasion resistance, and good stain resistance.

Thus, the present invention provides a fluorooxyalkylene group-containing polymer composition comprising a fluorooxyalkylene group-containing polymer having a hydrolyzable group at one terminal and a fluorooxyalkylene group-containing polymer having hydrolyzable groups at both terminals
wherein the fluorooxyalkylene group-containing polymers are represented by the following formula (1):

$$A\text{-}Rf^1\text{-}B \quad (1)$$

wherein $Rf^1$ is a divalent liner fluorooxyalkylene group having 5 to 100 repeating units represented by —$C_dF_{2d}O$—, wherein d is, independently of each other, an integer of from 1 to 6; and A and B are, independently of each other, an $Rf^2$ group or a group represented by the following formula (2), wherein $Rf^2$ is selected from the group consisting of F, H and a monovalent fluorinated group having a $CF_3$ or $CF_2H$ group at the terminal, wherein Q is a divalent organic group, Z is a divalent to septivalent organopolysiloxane group having a siloxane bond, R is an alkyl group having 1 to 4 carbon atoms or a phenyl group, X is a hydrolyzable group, a is 2 or 3, and b is an integer of from 1 to 6, c is an integer of from 1 to 5, and β is 0 or 1;
wherein of the $Rf^2$ group accounts for 30 to 75 mole %, relative to a total of all of the terminal groups in the composition, and provides a surface treatment agent comprising the same and an article treated with the agent.

Effects of the Invention

A coating obtained from the present fluorooxyalkylene group-containing polymer composition can adhere strongly to a substrate via the hydrolyzable silyl group. The present fluorooxyalkylene group-containing polymer composition comprises a polymer which has a hydrolyzable group at the one terminal, hereinafter called "a one-terminal modified polymer", and a polymer which has hydrolyzable groups at the both terminals, hereinafter called "a both-terminal modified polymer". A degree of steric freedom of the one-terminal modified polymer is larger than that of the both-terminal modified polymer, and contributes to lubricity of the surface. The one-terminal modified polymer can provide a good adhesiveness by itself. Further the both-terminal modified polymer gives the coating increased adhesion to a substrate in all around the coating. The fluorine atoms in the polymer tend to orient toward a surface of the coating to provide better water- and oil-repellency and releasing property.

The present fluorooxyalkylene group-containing polymer composition can provide a coating which has excellent water- and oil-repellency, low dynamic friction coefficient, good releasing property, good abrasion resistance and stain resistance. Therefore, the present composition can be used for a long period for various coating applications.

BEST MODES OF THE INVENTION

In the afore-mentioned formula (1), $Rf^1$ is a divalent fluorooxyalkylene group. This group may be linear in view of a low dynamic friction coefficient. Preferably, the fluorooxyalkylene group has 5 to 100, preferably 10 to 80, more preferably 15 to 60, repeating units represented by —$C_dF_{2d}O$—, wherein d is, independently of each other, an integer of from 1 to 6, preferably 1 to 4.

For the aforesaid repeating unit represented by the formula —$C_dF_{2d}O$—, mention may be made of the following units. $Rf^1$ may comprise a single kind of unit or a combination of two or more kinds of units.

—$CF_2O$—
—$CF_2CF_2O$—
—$CF_2CF_2CF_2O$—
—$CF_2CF_2CF_2CF_2O$—
—$CF_2CF_2CF_2CF_2CF_2O$—
—$CF_2CF_2CF_2CF_2CF_2CF_2O$—

Preferably, $Rf^1$ which comprises aforesaid repeating units is selected from the groups represented by the following formula (3) or (4):

$$—C_eF_{2e}(CF_2CF_2CF_2O)_pC_eF_{2e}— \quad (3)$$

wherein p is an integer of from 5 to 100 and e is an integer of from 1 to 3, $$—C_eF_{2e}(OC_2F_4)_f(OCF_2)_gOCF_2— \quad (4)$$

wherein f is an integer of from 0 to 80, g is an integer of from 0 to 80, a total of f and g is from 5 to 100, and e is an integer of from 1 to 3, and these repeating units may be sequenced at random. Preferably, a total of f and g is 10 to 80, more preferably 15 to 60. If the total of f and g is larger than the aforesaid upper limit, the adhesiveness and the curability may be poor. If the total of f and g is less than the aforesaid lower limit, the properties of the fluorooxyalkylene group cannot be provided sufficiently.

Among these, preferred is a group represented by the following formula (5) in view of a low dynamic friction coefficient:

$$—CF_2(OC_2F_4)_f(OCF_2)_gOCF_2— \quad (5)$$

wherein f is an integer of from 0 to 80, g is an integer of from 1 to 80, and f+g is an integer of from 5 to 100, and these repeating units may be sequenced at random.

In the afore-mentioned formula (1), A and B are, independently of each other, the $Rf^2$ group or a group represented by the following formula (2):

$$—QZ_\beta-\!\!\!+\!\!(CH_2)_c-\underset{X_a)_b}{\overset{R_{3-a}}{\underset{|}{Si}}}- \quad (2)$$

wherein $Rf^2$ is selected from F, H and a monovalent fluorinated group having a $CF_3$ or $CF_2H$ group at the terminal, and preferably a perfluoro group.

In the afore-mentioned formula (2), X is, independently of each other, a hydrolyzable group. Examples of X include alkoxy groups having 1 to 10 carbon atoms such as methoxy, ethoxy, propoxy and butoxy groups; oxyalkoxy groups having 2 to 10 carbon atoms such as methoxymethoxy and methoxyethoxy groups; acyloxy groups having 1 to 10 carbon atoms such as an acetoxy group; alkenyloxy groups having 2 to 10 carbon atoms such as an isopropenoxy group; and halogen atoms such as chlorine, bromine, and iodine atoms. Among these, methoxy, ethoxy, iropropenoxy groups and a chlorine atom are preferred.

R is an alkyl group having 1 to 4 carbon atoms such as methyl and ethyl groups, and a phenyl group. Among these, preferred is a methyl group. "a" is 2 or 3, preferably 3 in view of reactivity and adhesiveness to a substrate. "b" is an integer of from 1 to 6, preferably 1 to 3, and c is an integer of from 1 to 5, preferably 1 to 3.

In the afore-mentioned formula (2), Q is a linking group to connect $Rf^1$ with $Z^1$, or $Rf^1$ with the $(CH_2)_c$ group. Preferred is a hydrocarbon group having 2 to 12 carbon atoms which may have one or more bonds selected from an amide bond, an ether bond, an ester bond and a vinyl bond. Examples of Q include the following:

$$—CH_2OCH_2CH_2CH_2— \quad —CF_2OCH_2CH_2CH_2—$$

In the afore-mentioned formula (2), Z is a divalent to septivalent organopolysiloxane moiety having a siloxane bond. Z is preferably a liner or cyclic organopolysiloxane moiety having 2 to 13 silicon atoms, preferably 2 to 5 silicon atoms. Z may contain a silalkylene structure where two silicon atoms are bonded via an alkylene group, that is, $Si—(CH_2)_n—Si$. The present fluorooxyalkylene group-containing polymer composition has siloxane bonds in the molecule, so that the present composition can become a coating which has excellent attrition resistance and abrasion resistance.

Preferably, the organopolysiloxane moiety has an alkyl group having 1 to 8 carbon atoms, preferably 1 to 4 carbon atoms, or a phenyl group. The alkylene group in the silalkylene bond preferably has 2 to 6 carbon atoms, more preferably 2 to 4 carbon atoms. Examples of Z include the following;

The fluorooxyalkylene group-containing polymer composition having a CF$_3$ group at the terminal can be prepared by the following process.

First, a terminal of a perfluorooxy compound having carboxylic functions at the both terminals is partially fluorinated to obtain the following mixture of polymers. A conversion to the terminal CF$_3$ group can be controlled by adjusting the amount of the fluorine gas supplied to control the fluorination. Polymers having carboxylic functions may be adsorbed on an acid adsorbent to be separated, and a ratio of the one-terminal modified polymer and the both-terminal modified polymer can be determined according to $^{19}$F-NMR and $^1$H-NMR analysis.

wherein Rf is a divalent fluorooxyalkylene group, preferably having 5 to 100, more preferably 10 to 80, further preferably 15 to 60, repeating units represented by C$_d$F$_{2d}$O, wherein d is, independently of each other, an integer of from 1 to 6, and preferably 1 to 4.

A substituted or unsubstituted hydrocarbon group having 3 to 17 carbon atoms and an unsaturated group at a terminal is bonded to the terminal carboxylic functions in the afore-described polymers via an amide bond, an ether bond, an ester bond or a vinyl bond. The introduction may be carried out according to any conventional method. For instance, a fluorooxyalkylene group-containing polymer where the Rf$^1$ group is bonded to the (CH$_2$)$_c$ group, wherein c is 1, via —CH$_2$OCH$_2$CH$_2$— group can be prepared in the following process. First, the terminal carboxylic function remaining in the polymer mixture is reduced with sodium bis(2-methoxyethoxy)aluminum hydride or in a catalytic hydrogenation to obtain the following mixture of polymers, F$_3$C-Rf-CF$_2$CH$_2$OH HOH$_2$CCF$_2$-Rf-CF$_2$CH$_2$OH F$_3$C-Rf-CF$_3$ wherein Rf is as defined above, Then, a compound having an unsaturated terminal radical is reacted with in the terminal hydroxyl group of the perfluorooxyalkylene group-containing polymer according to a conventional method. For example, the afore-mentioned polymer mixture is reacted with brominated ally in the presence of tetrabutylammonium hydrogen sulfate, to which sodium hydroxide solution is then added dropwise to make it alkaline to thereby obtain the following mixture of polymers, F$_3$C-Rf-CF$_2$CH$_2$OCH$_2$CH=CH$_2$ H$_2$C=CHCH$_2$OCH$_2$CF$_2$-Rf-CF$_2$CH$_2$OCH$_2$CH=CH$_2$ F$_3$C-Rf-CF$_3$ wherein Rf is as defined above.

Subsequently, a hydrolyzable silyl group is introduced at the unsaturated terminal radical of the polymers. This is done by an addition reaction of the terminal unsaturated radical-containing polymers prepared from the afore-described process with an organosilicon compound having an SiH bond at one terminal and a hydrolyzable group at the other terminal. The hydrolyzable group is as described for X above. Examples of the organosilicon compound include a terminal alkoxy group-containing organohydrogensilane. For instance, in a case where the unsaturated terminal radical-containing polymers are reacted with trimethoxysilane, i.e., HSi(OCH$_3$)$_3$, a mixture of polymers as described below is obtained. The addition reaction can be carried out in the presence of an addition reaction catalyst, such as a platinum compound, according to any conventional method.

CF$_3$Rf-CF$_2$CH$_2$OC$_3$H$_6$Si(OCH$_3$)$_3$ (CH$_3$O)$_3$SiC$_3$H$_6$OCH$_2$CF$_2$-Rf-CF$_2$CH$_2$OC$_3$H$_6$Si(OCH$_3$)$_3$

CF$_3$-Rf-CF$_3$ wherein Rf is as defined above.

Alternatively, the unsaturated terminal radical-containing polymers may be reacted with an organosilicon compound having SiH bonds, for instance 2 to 8 SiH groups. After the end of the reaction, there are many remaining SiH bonds in a molecule of the polymers. Therefore, the remaining SiH groups are reacted with an organosilicon compound having an unsaturated radical and a hydrolyzable group to increase the number of a terminal hydrolyzable group.

Alternatively, the unsaturated terminal radical-containing polymers are reacted with an alkoxysilane compound having an SiH bond at a terminal, such as a 1:1 adduct of tetramethyldisiloxane (HM) with vinyltrimethoxysilane (VMS) to obtain the following mixture of polymers. The addition reaction can be carried out in the presence of an addition reaction catalyst, such as a platinum compound, according to any conventional method.

F₃C—Rf—CF₃ wherein Rf is as defined above,

Alternatively, the fluorooxyalkylene group-containing polymers which have the —CF₂H group at the terminal can be prepared by the following process. First, terminal carboxyl groups at both terminals of the flyorooxyalkyrene-containing polymer are converted to hydroxyl groups by reduction with sodium bis(2-methoxyethoxy)aluminum hydride or by catalytic hydrogenation with a noble metal catalyst to obtain the following mixture of polymers. A desired conversion to the terminal hydroxyl groups can be obtained by adjusting the amount of sodium bis(2-methoxyethoxy)aluminum hydride supplied or the like.

HOOCCF₂-Rf-CF₂CH₂OH

HOH₂CCF₂-Rf-CF₂CH₂OH

HOOCCF₂-Rf-CF₂COOH wherein Rf is as defined above,

The hydroxyl groups of the aforesaid mixture is reacted with brominated ally in the presence of tetrabutylammonium hydrogen sulfate, and then the mixture is made alkaline to convert the terminal hydroxyl groups into allyl ether groups; and CF₂COOH groups into CF₂H groups, resulting in the following mixture of polymers,

HF₂C-Rf-CF₂CH₂OCH₂CH=CH₂

H₂C=CHCH₂OCH₂CF₂-Rf-CF₂CH₂OCH₂CH=CH₂

HF₂C-Rf-CF₂H wherein Rf is as defined above,

Subsequently, the aforesaid fluorooxyalkylene group-containing polymers are reacted with a 1:1 adduct of tetramethyldisiloxane (HM) with vinyltrimethoxysilane (VMS) in the presence of a platinum compound to obtain the following mixture of polymers. The addition reaction can be carried out according to any conventional method, preferably in the presence of an addition reaction catalyst, such as a platinum compound, HF₂C—Rf—CF₂H wherein Rf is as defined above.

In the present fluorooxyalkylene group-containing polymer composition has the terminal Rf² group accounts preferably for 30 to 75 mole %, more preferably 40 to 70 mole %, relative to a total moles of all of the terminal groups. If the mole percentage exceeds the aforesaid upper limit, the number of the hydrolyzable groups which can react with a substrate is small, so that the adhesiveness is poor. If the mole percentage is less than the aforesaid lower limit, the properties of the both-terminal modified polymer is dominating, so that a low dynamic friction coefficient, good releasing property, and high water- and oil-repellency cannot be obtained.

The present fluorooxyalkylene group-containing polymer composition preferably comprises 40 to 90 mole %, more preferably 55 to 85 mole %, of the one-terminal modified polymer, and 10 to 60 mole %, more preferably 15 to 45 mole %, of the both-terminal modified polymer. If the amount of the one-terminal modified polymer is too large, the number of the hydrolyzable groups which can react with a substrate is too small, so that the adhesiveness is poor. If the amount of the both-terminal modified polymer is too large, the properties of the both-terminal modified polymer are dominating, so that low dynamic friction coefficient, good releasing property, and high water- and oil-repellency cannot be obtained.

The present fluorooxyalkylene group-containing polymer composition may further comprise a fluorooxyalkylene group-containing polymer whose terminals are not functionalized. The amount of the non-functionalized fluorooxyalkylene group-containing polymer is preferably 13 to 125 mole %, more preferably 18 to 95 mole %, relative to the total mole of the one-terminal modified polymer and the both-terminal modified polymer.

The present invention provides a surface treatment agent comprising the aforesaid fluorooxyalkylene group-containing polymer composition as an active ingredient. The composition may contain a condensate of a hydrolyzate which can be obtained by subjecting a part of the terminal hydrolyzable group(s) of the fluorooxyalkylene group-containing polymer composition to hydrolysis, which is then condensation reacted in a conventional manner.

The surface treatment agent may contain a catalyst for hydrolysis and condensation reactions. Examples of the catalyst include organic tin compounds such as bibutyltin dimethoxide and dibutyltin dilaurate; organic titanium compounds such as tetra-n-butyl titanate; organic acids such as acetic acid, methanesulfonic acid and fluorinated carboxylic acid; and inorganic acids such as hydrochloric acid and sulfuric acid. Among these, preferred are acetic acid, tetra-n-butyl titanate, dibutyltin dilaurate and fluorinated carboxylic acid. A content of the catalyst may be a catalytic amount, which ranges typically from 0.01 to 5 parts by weight, particularly from 0.1 to 1 part by weight, per 100 parts by weight of the fluorooxyalkylene group-containing polymer and/or the condensate of a hydrolyzate obtained by partially hydrolyzing the polymer composition.

The surface treatment agent may contain a solvent. Examples of the solvent include fluorinated aliphatic hydrocarbon solvents such as perfluoroheptane and perfluorooctane; fluorinated aromatic hydrocarbon solvents such as m-xylenehexafluoride, bezotrifluoride and 1,3-Bis(trifluoromethyl) benzene; fluorinated ether solvents such as methyl perfluorobutyl ether, ethyl perfluorobutyl ether, and perfluoro(2-butyltetrahydrofuran); fluorinated alkylamine solvents such as perfluorotributylamine and perfluorotripentylamine; hydrocarbon solvents such as petroleum benzene, mineral spirits, toluene, and xylene; ketone solvents such as acetone, methylethylketone, and methylisobutylketone. Among these, fluorinated solvents are preferred in view of solubility and wettability of the composition. Particularly preferred are m-xylenehexafluoride, perfluoro(2-butyltetrahydrofuran), perfluorotributylamine and ethyl perfluorobutyl ether.

A mixture of two or more of the aforesaid solvents may be used. Preferably, the fluorooxyalkylene group-containing polymer and the condensate of the hydrolyzate obtained by partially hydrolyzing the polymer composition are dissolved homogeneously. An optimum concentration of the fluorooxyalkylene group-containing polymer composition in a solvent may be decided, depending on treatment conditions, and is preferably from 0.01 to 10 wt %, particularly from 0.05 to 5 wt %.

The surface treatment agent may be applied to a substrate by any known methods, such as brushing, dipping, spraying and vapor deposition. The composition may be cured at a temperature selected depending on a curing method. When the composition is applied by brushing or dipping, a cured temperature is preferably from room temperature to 80 degrees C. The curing is carried out preferably in a humid environment to promote the curing reaction. A thickness of a cured coating may be selected depending on the type of a substrate, and is typically from 0.1 nm to 100 nm, particularly from 1 to 20 nm.

A substrate to be treated with the present surface treatment agent may be various substrates, such as paper, cloths, metals and metal oxides, glass, plastics, ceramics and quartz, but is not limited to these. The present composition can provide water- and oil-repellency, releasing property, low dynamic friction coefficient or stain resistance to these substrates.

Examples of an article to be treated and treatment with the present surface treatment agent include the following: coating for preventing fingerprints or sebum from adhering to optical articles such as car navigation equipments, mobile phones, digital cameras, digital camcorders, PDAs', portable audio players, car audio devices, game machines, lenses of spectacles, lenses of cameras, filters for lenses, dark glasses, medical devices such as gastric cameras, copy machines, personal computers, liquid crystal displays, organic EL displays, plasma displays, touch panel displays, protection films, and anti-reflection films; water-repellent and stainproof coatings for sanitary products such as bathtubs and washbasins; stainproof coatings for window glass of automobiles, trains and airplanes, and head lamp covers; water repellent and stainproof coatings for building materials for exterior wall; grease buildup-preventing coatings for kitchen building materials; water repellent, stainproof, bill-, poster- and graffiti-preventing coatings for telephone booths; coatings for water repellency and fingerprint prevention on artworks; coatings for preventing fingerprint on compact discs and DVDs'; release agents for nanoimprint molds; and for modifying flowability and dispersibility of paint additives, resin modifying agents, and inorganic fillers, or improving a lubrication property of tapes and films.

EXAMPLES

The present invention will be explained in detail by reference to the Examples and the Comparative Examples, but shall not be limited thereto.

The mixture of polymers represented by the following formulas (6a), (6b) or (6c) was prepared by partially fluorinating the perfluorooxy compound having carboxylic function at both terminals, C4000 from Solvay Solexis Inc., with a fluorine gas. The polymers having a carboxylic function(s) were adsorbed to an acid adsorbent and separated to determining a ratio of the polymers according to $^{19}$F-NMR analysis.

(6a)

(6b)

(6c)

(p/q=0.9, the average of p+q was 45)

Example 1

In a reactor, placed were and dissolved 50 g of the aforesaid mixture consisting of 52 mole % of (6a), 24 mole % of (6b) and 24 mole % of (6c), wherein the molar ratio of the terminal $CF_3$ group was 50 mole %, relative to the total moles of the terminal groups in the mixture, and a mixed solvent of g of 1,3-Bis(trifluoromethyl)benzene and 10 g of tetrahydrofuran. 30 Grams of a 40% solution of sodium bis (2-methoxyethoxy) aluminum hydride in toluene was added dropwise into the mixture and stirred at room temperature for 3 hours, to which appropriate amount of hydrochloric acid was added, and sufficiently stirred, and then washed with water. The lower phase was taken out and the solvent was distilled off to obtain 40 g of a liquid product. According to $^{19}$F-NMR analysis, the product obtained was a mixture of the compounds represented by the following formulas (7a), (7b) and (7c), and the molar ratio of the terminal $CF_3$ group was 50 mole %, relative to the total moles of the terminal groups.

(7a)

(7b)

(7c)

(p/q=0.9, the average of p+q was 45)

In a reactor, 40 g of the aforesaid mixture of the compounds of (7a), (7b) and (7c), 3.5 g of brominated ally and 0.4 g of tetrabutylammonium hydrogen sulfate were placed and stirred at 50 degrees C. for 3 hours. 5.2 Grams of an aqueous 30% sodium hydroxide solution was added dropwise and aged at 55 degrees C. for 12 hours. Then, an appropriate amount of fluorinated solvent, PF 5060 from 3M Ltd., and hydrochloric acid were added and stirred, and then washed with water. The lower phase was taken out and the solvent was distilled off to obtain 30 g of a liquid product. According to $^{19}$F-NMR and $^{1}$H-NMR analysis, the product obtained was a mixture of the compounds represented by the following formulas (8a), (8b) and (8c), and the molar ratio of the terminal $CF_3$ group was 50 mole %, relative to the total moles of the terminal groups.

(8a)

(8b)

(8c)

(p/q=0.9, the average of p+q was 45)

Subsequently, in a reactor, 30 g of the aforesaid mixture of the compounds of (8a), (8b) and (8c), 20 g of 1,3-Bis(trifluoromethyl)benzene and 3 g of hydrosilyl-containing alkoxysilane, 03 MS from Shinetsu chemical Co., Ltd., 0.10 g of a solution of a chloroplatinic acid/vinyl siloxane complex in toluene (containing $2.5 \times 10^{-8}$ mole of Pt) were placed and aged at 70 degrees C. for 1 week. Then, the solvent and unreacted compounds were distilled off under reduced pressure to obtain 29.8 g of a liquid product.

Figure 1:
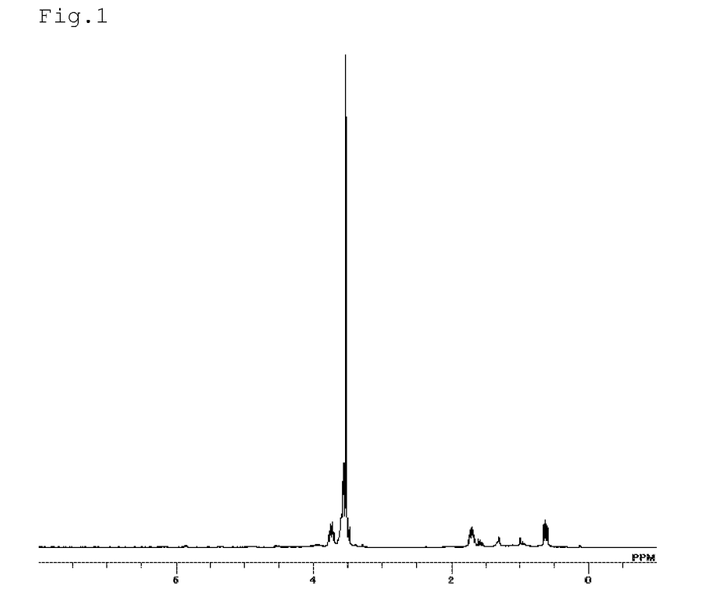
FIG. 1 is a chart of $^1$H-NMR spectra of the compound 1.

The $^1$H-NMR chart of the product obtained is shown in FIG. 1. The chemical shifts in $^1$H-NMR (reference: TMS, ppm) are as shown below.

—$CH_2CH_2Si$≡ 0.50~0.72 ppm, 1.61~1.72 ppm
$SiOCH_3$ 3.41~3.66 ppm
—$CH_2OCH_2$— 3.41~3.83 ppm The molar ratio of the terminal $CF_3$ group was 50 mole %, relative to the total moles of the terminal groups. The product obtained was the mixture of 52 mole % of (9a), 24 mole % of (9b) and 24 mole % of (9c) (hereinafter, referred to as Composition 1).

(9a)

(9b)

(9c)

(p/q=0.9, the average of p+q was 45)

Example 2

In a reactor, 30 g of the aforesaid mixture of the compounds of (8a), (8b) and (8c) were dissolved in 20 g of 1,3-Bis(trifluoromethyl)benzene, to which 0.10 g of a solution of a chloroplatinic acid/vinyl siloxane complex in toluene (containing $2.5 \times 10^{-8}$ mole of Pt) and 2.5 g of a 1:1 adduct (HM-VMS) of tetramethyldisiloxane (HM) with vinyltrimethoxysilane (VMS) were added dropwise, and then aged at 90 degrees C. for 2 hours. Then, the solvent and unreacted compounds were distilled off under reduced pressure to obtain 31.5 g of a liquid product.

The aforesaid HM-VMS was prepared in the following process.

In a reactor, 40 g of tetramethyldisiloxane (HM) and 40 g of toluene were placed and heated to 80 degrees C., to which a mixture of 44.2 g of vinyltrimethoxysilane (VMS) and 2 g of a solution of a chloroplatinic acid/vinyl siloxane complex in toluene (containing $1.1 \times 10^{-7}$ mole of Pt) was added dropwise slowly. Then, the resulting mixture was purified by distillation to obtain 84 g of an adduct (HM-VMS) represented by the following formula.

Figure 2:
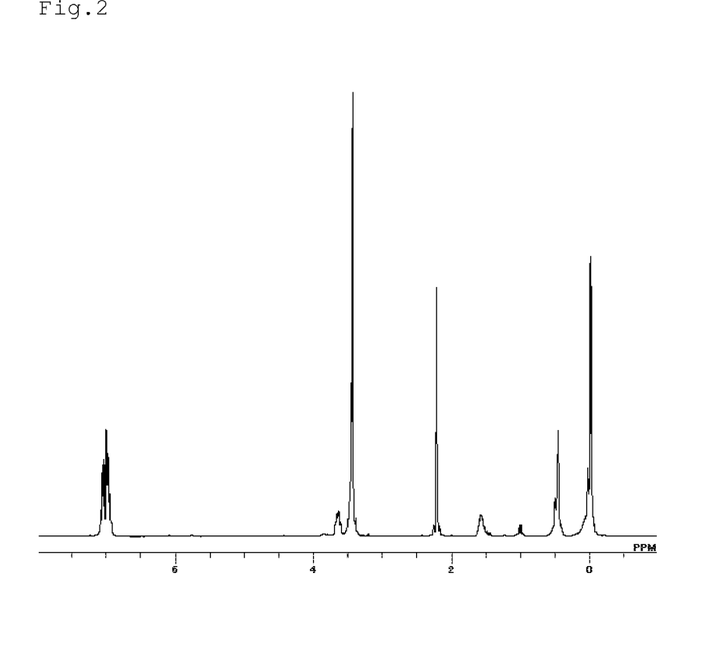
FIG. 2 is a chart of $^1$H-NMR spectra of the compound 2.

The $^1$H-NMR chart of the product obtained in Example 2 is shown in FIG. 2. The chemical shifts in $^1$H-NMR (reference: TMS, ppm) are as shown below. It is noted that, a peak around 2.4 ppm indicates toluene which was added in the determination, and does not relate to the obtained product.

| —$SiCH_3$—$CH$— | ≡$SiCH_2CH_2Si$≡ | $CH_3$ |
|---|---|---|
| 0.18~0.22 ppm | 0.34~0.61 ppm | 0.54~1.07 ppm |
| —$CH_2CH_2Si$≡ | —$SiOCH_3$ | —$CH_2OCH_2$— |
| 1.45~1.70 ppm | 3.32~3.58 | 3.32~3.74 |

The molar ratio of the terminal $CF_3$ group was 50 mole %, relative to the total moles of the terminal groups. The obtained product was a mixture of 52 mole % of (10a), 24 mole % of (10b) and 24 mole % of (10c) (hereinafter, referred to as Composition 2).

(10a)

(10b)

(10c)

(p/q=0.9, the average of p+q was 45)

Examples 3-7

The procedures in Example 1 were repeated to prepare compositions 3 to 7, except that the molar ratio of the terminal $CF_3$ group was 30 mole %, 40 mole %, 60 mole %, 70 mole % or 75 mole %, respectively.

Preparation of Surface Treatment Agents and Cured Coatings

The perfluorooxyalkylene group-containing polymer compositions obtained in Examples 1 to 7 were dissolved in 1,3-Bis(trifluoromethyl)benzene in a 20 wt % concentration to obtain surface treatment agents 1 to 7. 10 Milligrams of each surface treatment agent was vacuum deposited on each six glass slides, at a pressure of $3.8 \times 10^{-3}$ Pa and a temperature of 740 degrees C., and left at 40 degrees C. and an 80% humidity for 24 hours to form a cured coating. The three glass slides obtained were immediately washed by pouring a fluorinated solvent, AK 225 from Asahi Glass Co., Ltd., and a contact angle and a dynamic friction coefficient were determined, followed by a peeling test. Further, the remaining three glass slides were subjected to an abrasion resistant test.

Surface treatment agents and cured coatings of Comparative Examples 1 and 2 were prepared and evaluated by repeating the procedures of Example 2, except that the molar ratio of the terminal $CF_3$ group was 25 mole % or 85 mole %. Surface treatment agents and cured coatings of Comparative Examples 3 to 8 were prepared and evaluated by repeating the procedures in Examples 1 to 7, except that the compounds or compositions indicated below were used.

Comparative Example 3

$$(CH_3O)_3SiC_3H_6OCH_2-CF_2(OC_2F_4)_p(OCF_2)_q-OCF_2-CH_2OC_3H_6Si(OCH_3)_3$$

(p/q=0.9, the average of p+q was 45)

Comparative Example 4

The composition of 50 mole % of (11a), 25 mole % of (11b) and 25 mole % of (11c).

$$CH_3SiOSiC_3H_6OCH_2-CF_2(OC_2F_4)_p(OCF_2)_q-OCF_2-(CH_2OC_3H_6SiOSiC_2H_4Si(OCH_3)_3 \quad (11a)$$

with $CH_3$ groups on Si $$(CH_3O)_3SiC_2H_4SiOSiC_3H_6OCH_2-CF_2(OC_2F_4)_p(OCF_2)_q-OCF_2-CH_2OC_3H_6SiOSiC_2H_4Si(OCH_3)_3 \quad (11b)$$

$$(CH_3SiOSiC_3H_6OCH_2-CF_2(OC_2F_4)_p(OCF_2)_q-OCF_2-CH_2OC_3H_6SiOSiCH_3 \quad (11c)$$

(p/q=0.9, the average of p+q was 45)

Comparative Example 5

$$(CH_3O)_3SiC_2H_4SiOSiC_3H_6OCH_2-CF_2(OC_2F_4)_p(OCF_2)_q-OCF_2-CH_2OC_3H_6SiOSiC_2H_4Si(OCH_3)_3$$

(p/q=0.9, the average of p+q was 45)

Comparative Example 6

$$F-(CFCF_2O)_{24}-CF-CONH-C_3H_6Si(OCH_3)_3$$
with $CF_3$ branches

Comparative Example 7

$$F-(CFCF_2O)_{24}-CF-CH_2-O-C_3H_6Si(OCH_3)_3$$
with $CF_3$ branches

Comparative Example 8

$$CF_3(OC_2F_4)_p(OCF_2)_q-OCF_3$$

(p/q=0.9, the average of p+q was 45)

The cured coatings obtained were evaluated in the following method.

Evaluation of Water- and Oil-Repellency

Using a contact angle meter, prop Master from Kyowa Interface Science Co., Ltd., a water contact angle and an oleic acid contact angle of the cured coatings were measured.

Dynamic Friction Coefficient

The dynamic friction coefficient against Bemcot from Asahi Kasei was measured in the following conditions with a surface property test machine, 14FW from Shinto Scientific Co., Ltd.

Contact area: 35 mm×35 mm
Load: 200 g

Evaluation of Releasing Property

The releasing property was measured in the following conditions with an autograph, AG-IS from Shimadzu Co., Ltd.
- Treatment with an adhesive (an adhesive tape was sticked to a test piece): Nitto No. 31 B, 19 mm in width
- Bonding pressure: load of 20 g/cm$^2$
- Aging: 25 degrees C./24 hours
- Peeling speed: 300 mm/minute, angle of 180 degrees Evaluation of a Property of Wipping Off Marking Ink A surface of the cured coating was painted with a permanent marker, High Macky from Zebra Co., Ltd. Then, the marking ink was wiped off with tissue paper, Ellemoi from Kamishoji Co., Ltd. The surface after wiped off was visually observed to evaluate on the following criteria:

+++: all of the marking ink was wiped off easily at one time,

++: a little marking ink remained after one time wipping,

+: almost a half of the marking ink remained after one time wipping, and

−: the marking ink could not be wiped off at all.

Scrub Resistance

Using a rubbing tester from Shinto Scientific Co., Ltd., the cured coating was scrubbed under the following conditions, and then the water repellency and the marking ink-wiping off property were evaluated.
- Test environment: 25 degrees C., relative humidity of 40%
- Scrubbing material: A steel wool, BONSTAR #0000, fixed on a tip (1 cm$^2$) of a tester which top contacts with the cured coating
- Scrub distance (one way): 30 mm
- Scrub speed: 1800 mm/min
- Load: 1 kg
- Number of scrubbing times: 400 times The results are as seen in Table 1.

TABLE 1

| | water repellency (°) | oil repellency (°) | dynamic friction coefficient | releasing property, N/18 mm | property of wipping off marking ink |
|---|---|---|---|---|---|
| Example 1 | 114 | 73 | 0.05 | 0.05 | +++ |
| Example 2 | 116 | 73 | 0.05 | 0.05 | +++ |
| Example 3 | 111 | 71 | 0.07 | 0.05 | +++ |
| Example 4 | 112 | 71 | 0.06 | 0.05 | +++ |
| Example 5 | 115 | 73 | 0.05 | 0.04 | +++ |
| Example 6 | 116 | 74 | 0.04 | 0.04 | +++ |
| Example 7 | 112 | 72 | 0.07 | 0.08 | +++ |
| Comparative Example 1 | 109 | 69 | 0.07 | 0.10 | +++ |
| Comparative Example 2 | 90 | 63 | 0.25 | 0.33 | + |
| Comparative Example 3 | 110 | 70 | 0.10 | 0.12 | +++ |
| Comparative Example 4 | 107 | 66 | 0.07 | 0.12 | +++ |
| Comparative Example 5 | 110 | 68 | 0.10 | 0.12 | +++ |
| Comparative Example 6 | 115 | 74 | 0.24 | 0.15 | +++ |
| Comparative Example 7 | 115 | 75 | 0.23 | 0.35 | +++ |
| Comparative Example 8 | 56 | 60 | 0.34 | 0.40 | + |

The perfluorooxyalkylene group-containing polymer compositions of Examples 1 to 7 had the high water- and oil-repellency and the low dynamic friction coefficients. The compounds of Comparative Examples 3 and 5 were a perfluorooxyalkylene group-containing polymer having hydrolyzable groups at the both terminals. The both terminals of the molecule were fixed to the substrate, so that the dynamic friction coefficients were high, the water- and oil-repellency and releasing property were inferior to those of the Examples. The composition of Comparative Example 4 did not have a terminal fluorine group, so that the water- and oil-repellency and releasing property were inferior to those of the Examples. The polymer of Comparative Example 8 did not have a hydrolyzable group and could not bond to the substrate, so that the polymer could not be fixed on the substrate and the desired surface property could not be obtained. The compound of Comparative Examples 6 and 7 having a branched structure in the perfluorooxyalkylene chain had a high kinetic viscosity, so that the dynamic friction coefficient was high and the releasing property was inferior to those of the Examples.

The results of the scrub resistance test are as seen in Table 2.

TABLE 2

| | water repellency after scrubbed (°) | marking ink-wiping off property after scrubbed |
|---|---|---|
| Example 1 | 105 | +++ |
| Example 2 | 105 | +++ |
| Example 3 | 100 | ++ |
| Example 4 | 102 | ++ |
| Example 5 | 107 | +++ |
| Example 6 | 102 | ++ |
| Example 7 | 100 | ++ |
| Comparative Example 1 | 91 | − |
| Comparative Example 2 | 76 | − |
| Comparative Example 3 | 85 | − |
| Comparative Example 4 | 92 | − |
| Comparative Example 5 | 85 | − |
| Comparative Example 6 | 54 | − |
| Comparative Example 7 | 65 | − |
| Comparative Example 8 | 49 | − |

As seen in Table 2, the perfluorooxyalkylene group-containing polymer of Examples 1 to 7 could maintain the property of the coating after scrubbed with the steel wool. However, the cured coatings of Comparative Examples 1 to 8 were peeled off easily.

INDUSTRIAL APPLICABILITY

The fluoropolyoxyalkylene group-containing polymer composition of the present invention can provide a coating which has excellent water- and oil-repellency, low dynamic friction coefficient, good releasing property, and abrasion resistance. Therefore, the present composition can be used in various coating applications for a long period of time. Additionally, the coating has excellent stain resistance, so that the present composition can be used suitably for a coating for lenses of spectacles, anti-reflection films, polarization plates, television sets, touch panel displays, mobile phones, accessories and precision molds.

The invention claimed is:

1. A fluorooxyalkylene group-containing polymer composition comprising a fluorooxyalkylene group-containing polymer having a hydrolyzable group at one terminal and a fluorooxyalkylene group-containing polymer having hydrolyzable groups at both terminals
wherein the fluorooxyalkylene group-containing polymers are represented by the following formula (1):

$$A\text{-}Rf^1\text{-}B \quad (1)$$

wherein
Rf$^1$ is a divalent linear fluorooxyalkylene group having 5 to 100 repeating units represented by —C$_d$F$_{2d}$O—, wherein d is, independently of each other, an integer of from 1 to 6; and
A and B are, independently of each other,
an Rf$^2$ group, wherein Rf$^2$ is selected from the group consisting of F, H and a monovalent fluorinated group having a CF$_3$ or CF$_2$H group at the terminal, or
a group represented by the following formula (2)

$$\text{—QZ}_\beta\text{—}(\text{CH}_2)_c\text{—}\underset{\underset{X_a)_b}{|}}{\overset{R_{3-a}}{\text{Si}}} \quad (2)$$

wherein
Q is a divalent organic group,
Z is a divalent to septivalent organopolysiloxane group having a siloxane bond, which is a linear or cyclic organopolysiloxane moiety having 2 to 5 silicon atoms,
R is an alkyl group having 1 to 4 carbon atoms or a phenyl group,
X is a hydrolyzable group,
a is 2 or 3, and
b is an integer of from 1 to 6,
c is an integer of from 1 to 5, and
β is 1;
wherein the terminal Rf$^2$ group accounts for 30 to 75 mole %, relative to a total of all of the terminal groups in the composition.

2. The fluorooxyalkylene group-containing polymer composition according to claim 1, wherein the composition comprises
40 to 90 mole % of the fluorooxyalkylene group-containing polymer having a hydrolyzable group at one terminal, and
10 to 60 mole % of the fluorooxyalkylene group-containing polymer having hydrolyzable groups at both terminals.

3. The fluorooxyalkylene group-containing polymer composition according to any one of claims 1 and 2, wherein Rf$^1$ is a divalent linear fluorooxyalkylene group represented by the following formula (5);

$$\text{—CF}_2(\text{OC}_2\text{F}_4)_f(\text{OCF}_2)_g\text{OCF}_2\text{—} \quad (5)$$

wherein f is an integer of from 0 to 80, g is an integer of from 1 to 80, and a total of f and g is from 5 to 100, and these repeating units may be sequenced at random.

4. The fluorooxyalkylene group-containing polymer composition according to claim 1, wherein
Q is a hydrocarbon group having 2 to 12 carbon atoms and may have one or more bond selected from the group consisting of an amide bond, an ether bond, an ester bond and a vinyl bond.

5. The fluorooxyalkylene group-containing polymer composition according to claim 1, wherein
X is a group selected from the group consisting of alkoxy groups, oxyalkoxy groups, acyloxy groups, alkenyloxy groups and halogen atoms.

6. A surface treatment agent comprising a fluorooxyalkylene group-containing polymer composition comprising a fluorooxyalkylene group-containing polymer having a hydrolyzable group at one terminal and a fluorooxyalkylene group-containing polymer having hydrolyzable groups at both terminals
wherein the fluorooxyalkylene group-containing polymers are represented by the following formula (1):

$$A\text{-}Rf^1\text{-}B \quad (1)$$

wherein
Rf$^1$ is a divalent linear fluorooxyalkylene group having 5 to 100 repeating units represented by —C$_d$F$_{2d}$O—, wherein d is, independently of each other, an integer of from 1 to 6; and
A and B are, independently of each other,
an Rf$^2$ group, wherein Rf$^2$ is selected from the group consisting of F, H and a monovalent fluorinated group having a CF$_3$ or CF$_2$H group at the terminal, or
a group represented by the following formula (2)

$$\text{—QZ}_\beta\text{—}(\text{CH}_2)_c\text{—}\underset{\underset{X_a)_b}{|}}{\overset{R_{3-a}}{\text{Si}}} \quad (2)$$

wherein
Q is a divalent organic group,
Z is a divalent to septivalent organopolysiloxane group having a siloxane bond, which is a linear or cyclic organopolysiloxane moiety having 2 to 5 silicon atoms,
R is an alkyl group having 1 to 4 carbon atoms or a phenyl group,
X is a hydrolyzable group,
a is 2 or 3, and
b is an integer of from 1 to 6,
c is an integer of from 1 to 5, and
β is 1;
wherein the terminal Rf$^2$ group accounts for 30 to 75 mole %, relative to a total of all of the terminal groups in the composition,
and/or a condensate of a hydrolyzate obtained by partially hydrolyzing the polymer composition.

7. An article treated with the surface treatment agent according to claim 6.

8. An optical article treated with the surface treatment agent according to claim 6.

* * * * *